(12) United States Patent
Barg (10) Patent No.: US 10,587,174 B2
(45) Date of Patent: Mar. 10, 2020

(54) ELECTRIC MOTOR AND METHOD OF ASSEMBLING AN ELECTRIC MOTOR

(71) Applicant: FRANKLIN ELECTRIC CO., INC., Fort Wayne, IN (US)

(72) Inventor: Heinz Barg, Wittlich (DE)

(73) Assignee: Franklin Electric Co., Inc., Fort Wayne, IN (US)

(\*) Notice: Subject to any disclaimer, the term of this patent is extended or adjusted under 35 U.S.C. 154(b) by 204 days.

(21) Appl. No.: 15/712,921

(22) Filed: Sep. 22, 2017

(65) Prior Publication Data

US 2018/0013335 A1 Jan. 11, 2018

Related U.S. Application Data

(63) Continuation of application No. PCT/US2016/023410, filed on Mar. 21, 2016.

(Continued)

(51) Int. Cl.
*H02K 15/16* (2006.01)
*H02K 7/08* (2006.01)
(Continued)

(52) U.S. Cl.
CPC ............ *H02K 15/165* (2013.01); *H02K 5/15* (2013.01); *H02K 7/04* (2013.01); *H02K 7/083* (2013.01);
(Continued)

(58) Field of Classification Search
CPC .......... H02K 7/083; H02K 5/15; H02K 15/16; H02K 7/04; H02K 15/165; H02K 15/14; H02K 5/132; H02K 5/161
See application file for complete search history.

(56) References Cited

U.S. PATENT DOCUMENTS

| 4,505,031 A | 3/1985 | Colwell |
| 4,684,837 A | 8/1987 | Schaefer |

(Continued)

FOREIGN PATENT DOCUMENTS

| DE | 102006017005 | 10/2006 |
| EP | 1 536 545 | 6/2005 |

(Continued)

OTHER PUBLICATIONS

International Preliminary Report on Patentability, dated Oct. 5, 2017, for corresponding International Patent Application No. PCT/US2016/023410.

(Continued)

*Primary Examiner* — Naishadh N Desai
(74) *Attorney, Agent, or Firm* — Faegre Baker Daniels LLP (57) ABSTRACT

A method of assembling an electric motor comprises axially translating a rotor of a rotor assembly in a first direction through a longitudinal bore of a stator, a first centering ring of the rotor assembly preventing a first end of the rotor from contacting an internal surface of the longitudinal bore; rotatably supporting a first end of the rotor assembly longitudinally extending from the rotor with a first support member; resting a second centering ring of the rotor assembly on the internal surface of the longitudinal bore; rotatably supporting a second end of the rotor assembly longitudinally extending from the rotor with a second support member; and axially translating the rotor assembly in a second direction, opposite the first direction, to place the rotor assembly in a position in which both the first centering ring and the second centering ring are outside the longitudinal bore.

16 Claims, 8 Drawing Sheets

Related U.S. Application Data (60) Provisional application No. 62/146,892, filed on Apr. 13, 2015, provisional application No. 62/136,927, filed on Mar. 23, 2015.

(51) Int. Cl.
  H02K 5/15 (2006.01)
  H02K 7/04 (2006.01)
  H02K 5/132 (2006.01)
  H02K 5/16 (2006.01)
  H02K 15/14 (2006.01)

(52) U.S. Cl.
  CPC ............. H02K 15/16 (2013.01); H02K 5/132 (2013.01); H02K 5/161 (2013.01); H02K 15/14 (2013.01)

(56) References Cited

U.S. PATENT DOCUMENTS

| | | | |
|---|---|---|---|
| 4,955,128 A | 9/1990 | Sogabe | |
| 7,067,953 B1* | 6/2006 | Hans | H02K 1/148 |
| | | | 29/596 |
| 7,355,316 B2 | 4/2008 | Yokota | |
| 2002/0093262 A1 | 7/2002 | Zepp | |
| 2006/0119197 A1 | 6/2006 | Puterbaugh | |
| 2006/0152096 A1* | 7/2006 | Helmi | H02K 5/15 |
| | | | 310/90 |
| 2006/0250044 A1 | 11/2006 | Yokota | |
| 2009/0115264 A1 | 5/2009 | Poskie | |
| 2010/0060094 A1 | 3/2010 | Yokoyama | |
| 2011/0198964 A1* | 8/2011 | Biederman | B22C 9/04 |
| | | | 310/211 |
| 2011/0241473 A1* | 10/2011 | Hippen | H02K 17/165 |
| | | | 310/211 |

FOREIGN PATENT DOCUMENTS

| | | |
|---|---|---|
| EP | 2299560 | 3/2011 |
| JP | 2009207212 | 9/2009 |
| JP | 201239732 | 2/2012 |
| JP | 201430345 | 2/2014 |
| WO | WO 88/06373 | 8/1988 |
| WO | WO 96/31936 | 10/1996 |
| WO | WO 2007/131889 | 11/2007 |

OTHER PUBLICATIONS

Supplemental Search Report in corresponding EP Application No. 16 76 9491, dated Oct. 1, 2018, 11 pages.

International Search Report and Written Opinion of the International Searching Authority, dated Aug. 8, 2016, for corresponding International patent application No. PCT/US2016/023410; 12 pages.

\* cited by examiner

ELECTRIC MOTOR AND METHOD OF ASSEMBLING AN ELECTRIC MOTOR

CROSS-REFERENCE TO RELATED APPLICATIONS

The present application is a continuation of International Application No. PCT/US16/23410, filed on Mar. 21, 2016, which claims the benefit of priority from U.S. Provisional Patent Application Nos. 62/146,892, filed on Apr. 13, 2015, and 62/136,927, filed on Mar. 23, 2015, all bearing the same title as the present application and incorporated in their entirety herein by reference.

TECHNICAL FIELD

The present disclosure relates to electric motors, and more particularly to a method of assembling an electric motor.

BACKGROUND OF THE DISCLOSURE

An electric motor, or motor, includes a rotor, electrical windings, and a stator. Application of electrical energy to the electrical windings causes the rotor to rotate within the stator. The electrical windings can be part of the rotor, the stator, or both. If the motor only has electrical windings in the rotor or the stator, it is permanent magnet motor, and includes a permanent magnet that reacts to the flow of current through the electrical windings to cause the rotor to rotate.

In the permanent magnet motor the rotor and the stator magnetically attract each other which makes assembly of the motor difficult, particularly if the motor is large. If the rotor is permitted to become magnetically attached to the stator while one end of the rotor is inside the stator, it is difficult to separate them. Pulling the rotor out of the stator may damage the stator or the rotor or both. Gravity may cause similar problems and thus similar damage may result during assembly of electric motors that are not permanent magnet motors. Accordingly, there is a need for improved electric motors and improved methods of assembling electric motors.

SUMMARY OF DISCLOSED EMBODIMENTS

Embodiments of an electric motor assembly and a method of assembling an electric motor are provided herein. In one embodiment, a method of assembling an electrical motor comprises axially translating a rotor of a rotor assembly in a first direction through a longitudinal bore of a stator, a first centering ring of the rotor assembly preventing a first end of the rotor from contacting an internal surface of the longitudinal bore; rotatably coupling a first end of the rotor assembly longitudinally extending from the rotor with a first support member; resting a second centering ring of the rotor assembly on the internal surface of the longitudinal bore; while resting the second centering ring, rotatably coupling a second end of the rotor assembly longitudinally extending from the rotor with a second support member; and axially translating the rotor assembly in a second direction, opposite the first direction, to place the rotor assembly in a position in which both the first centering ring and the second centering ring are outside the longitudinal bore.

In another embodiment, an electric motor assembly comprises means for conducting electrical current; rotating means; stationary means for rotatably receiving the rotating means, the rotating means and the stationary means configured to cause the rotating means to rotate upon application of electrical energy to the means for conducting electrical current; first centering means disposed on a first end of the rotating means for preventing contact between the rotating means and the stationary means during assembly; second centering means disposed on a second end of the rotating means for preventing contact between the rotating means and the stationary means during assembly; and support means for rotatably supporting the first end of the rotating means and stopping longitudinal translation of the rotating means through the stationary means during assembly, wherein the support means is secured to the stationary means to define a longitudinal distance therebetween, said longitudinal distance configured to permit, during assembly, positioning of the second centering means within a longitudinal cavity of the stationary means while the first centering means is positioned outside the longitudinal cavity adjacent the support means.

In a further embodiment, an electric motor assembly comprises electrical windings; a stator assembly including a stator core having a longitudinal bore with an inner diameter; a rotor assembly including a rotor, a first end extending longitudinally from the rotor, a second end extending longitudinally from the rotor, a first centering ring on the first end, and a second centering ring on the second end, the first centering ring having an outer diameter smaller than the inner diameter of the longitudinal bore and larger than an outer diameter of the rotor to prevent contact between the longitudinal bore and a first end of the rotor during assembly, the rotor assembly configured to rotate upon application of electrical energy to the electrical windings; and a first support member having a stop surface configured to stop longitudinal translation of the rotor assembly during assembly of the electrical motor, the first support member secured to the stator assembly and configured to permit, during assembly of the electrical motor, positioning of the second centering ring within the longitudinal bore while the first centering ring is positioned outside the longitudinal bore and adjacent the stop surface.

The above-mentioned and other features of the invention and the manner of obtaining them will become more apparent and the invention itself will be better understood by reference to the following description of exemplary embodiments of the invention taken in conjunction with the accompanying drawings. These above-mentioned and other features of the invention may be used in any combination or permutation.

BRIEF DESCRIPTION OF THE DRAWINGS

The accompanying figures illustrate embodiments of the present disclosure and, together with the detailed description, serve to explain the principles of the invention.

Corresponding reference characters indicate corresponding parts throughout the several views. Although the drawings represent embodiments of the present disclosure, the drawings are not necessarily to scale and certain features may be exaggerated in order to better illustrate and explain the present invention. The exemplifications set out herein illustrate embodiments of the disclosure, and such exemplifications are not to be construed as limiting the scope of the invention in any manner.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

An electric motor, an electric motor assembly, and a method of assembling the electric motor are disclosed herein. In one example the electric motor is a permanent magnet motor. In a permanent magnet motor the rotor and the stator magnetically attract each other which makes assembly of the motor difficult, particularly if the motor is large. The electric motor is assembled in accordance with the method described hereinbelow to prevent contact between the stator and the rotor, thus facilitating assembly. The method is also applicable to electric motors which are not permanent magnet motors, where other forces, e.g., gravity, make assembly of the electric motor difficult.

The electric motor comprises a stator assembly including a stator core having a longitudinal bore, and a rotor assembly including a rotor configured to rotate within the longitudinal bore when the motor is electrically energized. In addition to the rotor, the rotor assembly includes a first end extending from the rotor toward a first end of the motor, a second end extending from the rotor toward a second, opposite, end of the motor, a first centering ring on the first end, and a second centering ring on the second end. The motor also comprises a first support member configured to support the first end of the rotor assembly and a second support member configured to support the second end of the rotor assembly when the motor has been assembled. The first support member is positioned relative to the stator core to permit assembly of the electric motor according with the method set forth below to prevent contact between the rotor and the stator core during assembly.

In some embodiments, a first sleeve is placed over the first end of the rotor assembly and a second sleeve is placed over the second (opposite) end of the rotor assembly. The sleeves aid in the placement of the rotor assembly within the stator core while preventing damage to the stator core and the rotor. The first sleeve comprises inner and outer diameters corresponding to the diameters of the first end and the stator core. The second sleeve comprises inner and outer diameters corresponding to the diameters of the second end and the stator core. The sleeves can comprise polymeric materials, including foam, thermoplastic, and thermoset polymers, soft metals (e.g., copper and brass) and any other material softer than the stator core but rigid enough to support the weight of the rotor without exhibiting significant compression. The sleeves are removed during assembly prior to rotatably supporting the first and the second ends of the rotor with support members. A guide member can be removably attached to one end of the stator assembly to support one of the sleeves during assembly, while the opposite end sleeve is supported by the stator core or the support member.

Figure 1:
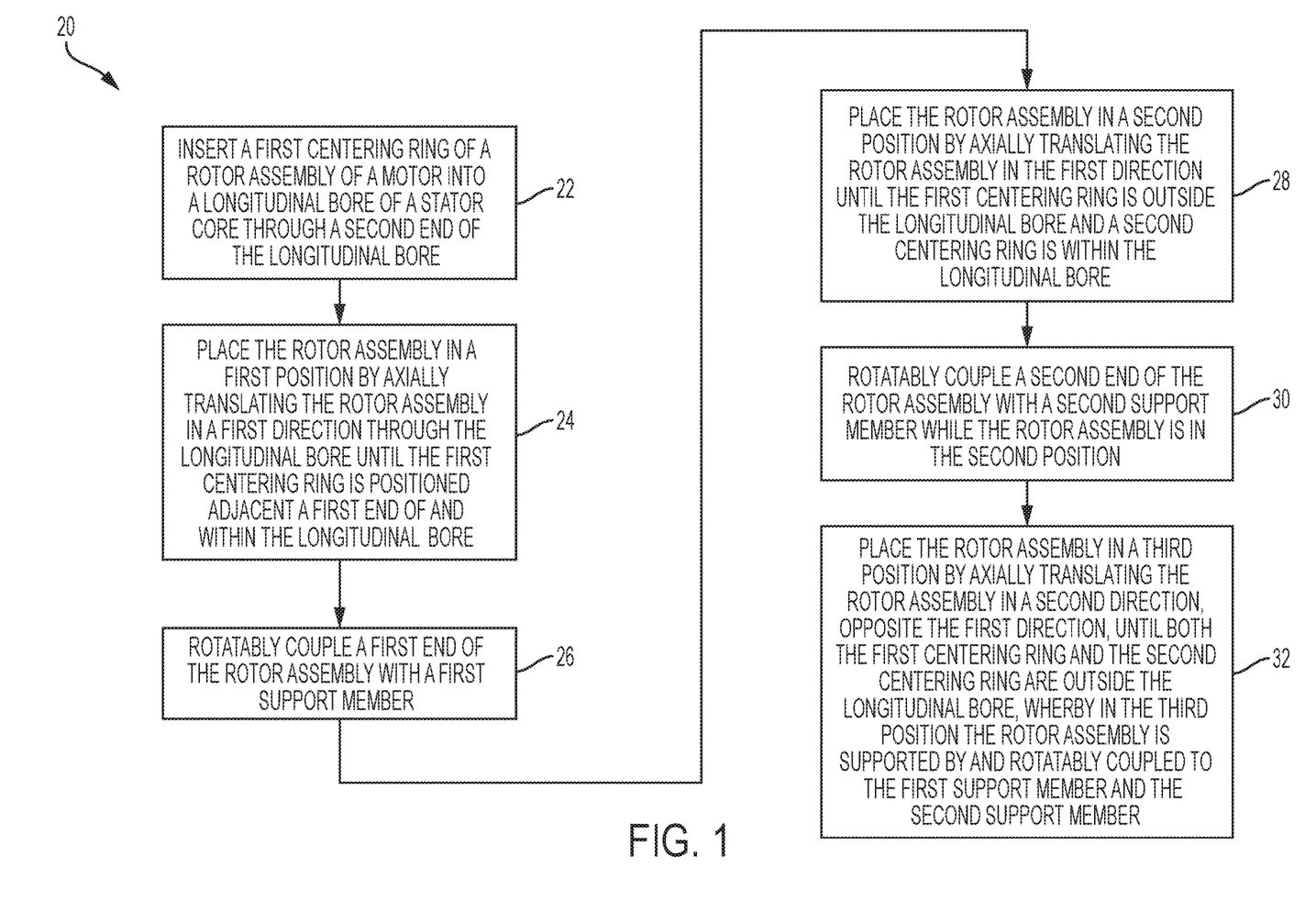
FIG. 1 is a flowchart of an embodiment of a method of assembling an electric motor set forth in the present disclosure.

FIG. 1 is a flowchart, denoted by numeral 20, of an embodiment of the method of assembling the electric motor described in the preceding paragraph and in additional detail with reference to FIGS. 2-8. The method begins at 22, with inserting the first centering ring of the rotor assembly of the motor into the longitudinal bore through the second end of the longitudinal bore. The first centering ring has an outer diameter larger than the outer diameter of the rotor but smaller than the inner diameter of the longitudinal bore. Thus, the first centering ring prevents contact between the end of the rotor inserted in the longitudinal bore and the internal surface of the longitudinal bore. Of course, when used the first sleeve also prevents contact between the first end of the rotor and the internal surface of the longitudinal bore.

Figure 5:
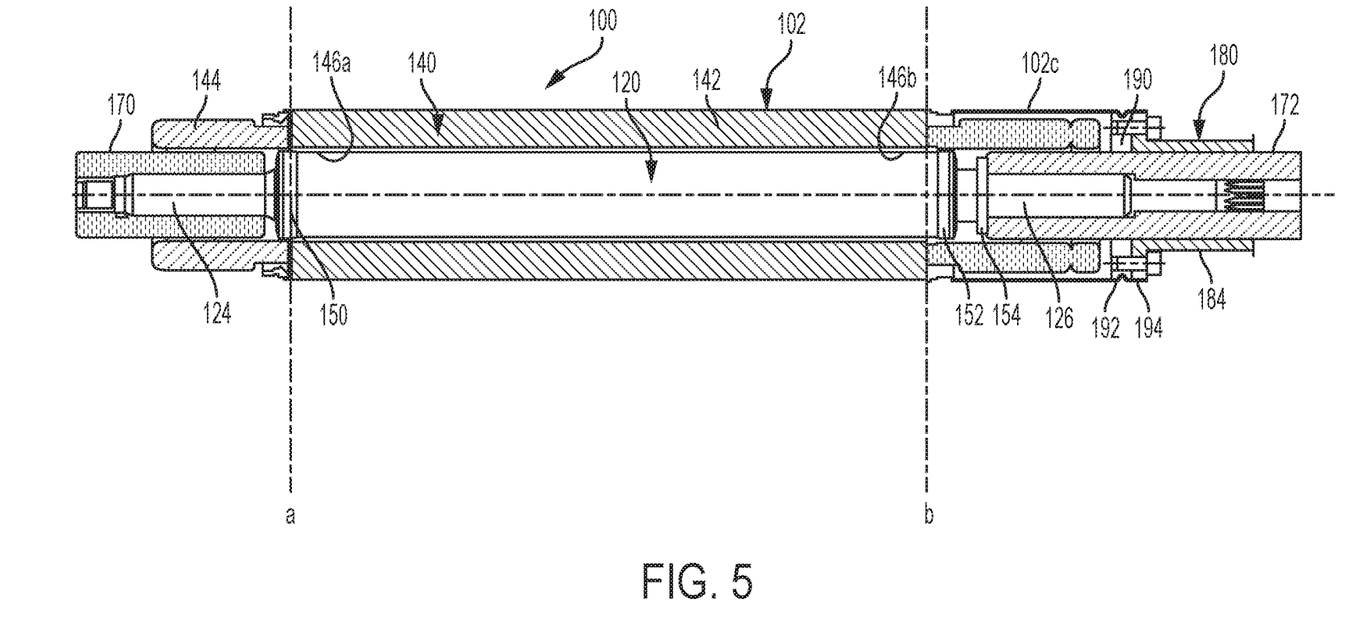
FIGS. 5 and 6 are elevational, partial sectional views of the electric motor of FIG. 2 taken along a plane intersecting the longitudinal axis of the electric motor and illustrating a first position of the rotor assembly of FIG. 4 relative to a stator assembly of the electric motor.
Figure 6:
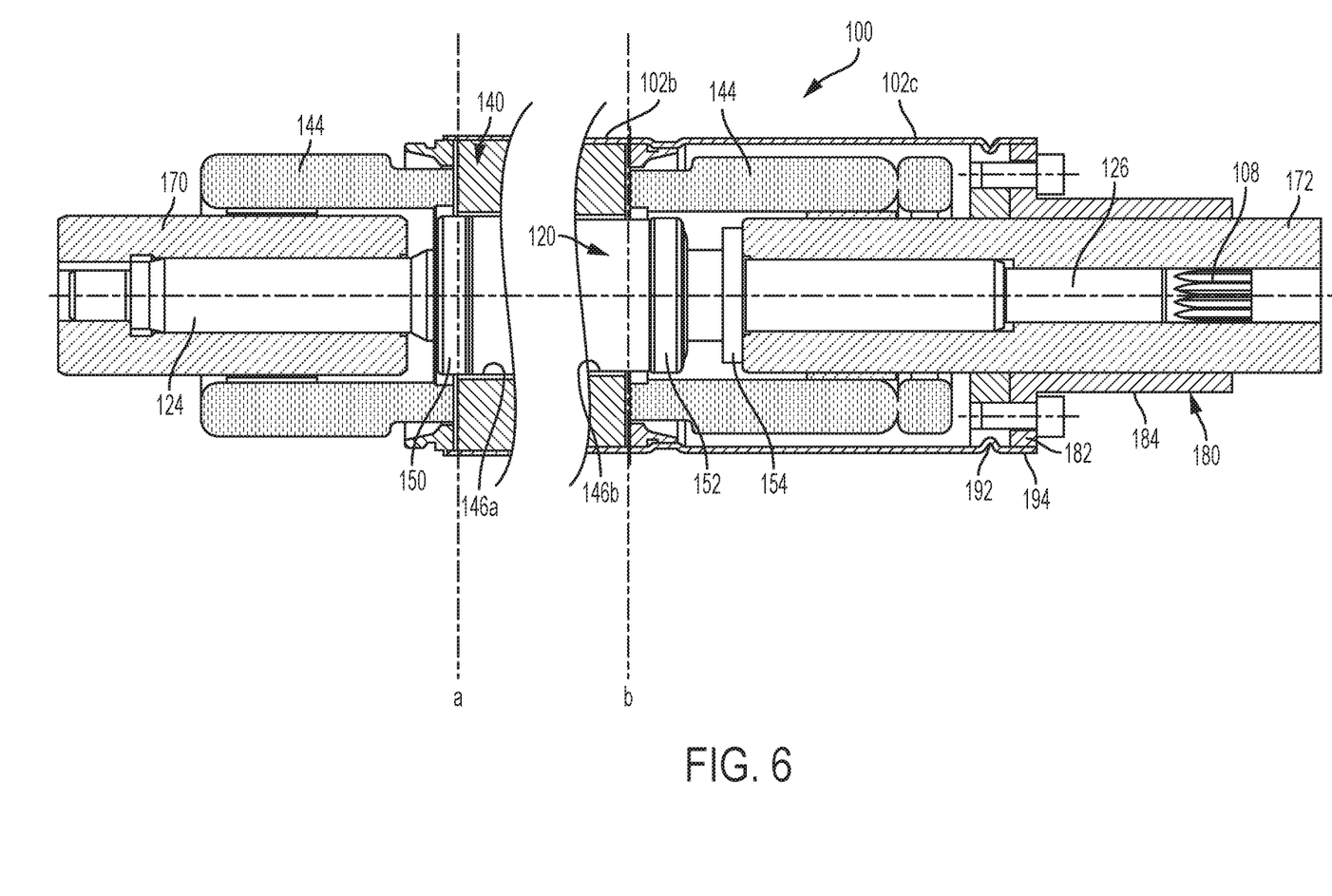

The method continues at 24, with placing the rotor assembly in a first position by axially translating the rotor assembly in a first direction through the longitudinal bore until the first centering ring is positioned adjacent a first end of and within the longitudinal bore. As defined herein, the term "within" comprises "partially within". FIGS. 5 and 6 illustrate rotor assembly 120 in the first position, showing centering ring 150 within first end 146a of longitudinal bore 146.

The method continues at 26, with rotatably supporting the first end of the rotor assembly with the first support member. In one example, the rotor assembly rests in the first position while the first support member is slipped over the first end and is secured to the stator assembly to define a distance between them. In a variation of the present embodiment, the method comprises sliding a first sleeve over the first end of the rotor assembly before inserting the rotor assembly into the stator core. The first sleeve protects the first end of the rotor assembly, and the rotor, from physical damage, and guides the rotor through longitudinal bore 146. The first sleeve is removed after the rotor assembly is placed in the first position to enable the first support member to receive the first end of the rotor assembly. In another variation of the present embodiment, the first support member is secured to the stator assembly and then the first end of the rotor assembly is inserted therein as the rotor assembly is axially translated past the first position, in which case the rotor assembly does not necessarily rest in the first position.

Figure 7:
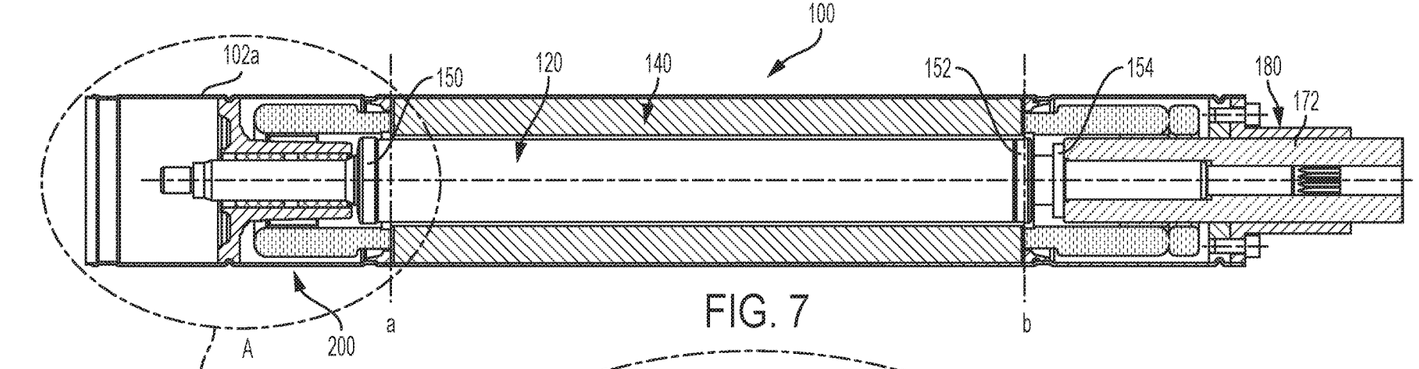
FIGS. 7 and 8 are elevational, partial sectional views of the electric motor of FIG. 2 illustrating a second position of the rotor assembly of FIG. 4 relative to the stator assembly of the electric motor.
Figure 8:
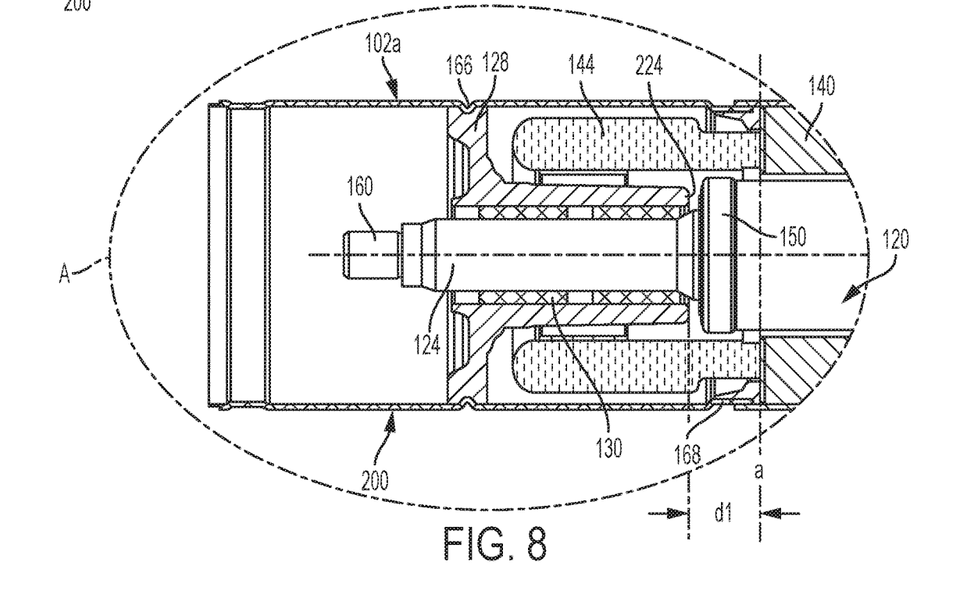

The method continues at 28, with placing the rotor assembly in a second position by axially translating the rotor assembly in the first direction until the first centering ring is outside the longitudinal bore and a second centering ring is within the longitudinal bore. In this position the first end is supported by the first support member. FIGS. 7 and 8 illustrate rotor assembly 120 in the second position, showing first centering ring 150 outside first end 146a of longitudinal bore 146 and second centering ring 152 within second end 146b of longitudinal bore 146. Second centering ring 152 has an outer diameter larger than an outer diameter of rotor 122 and smaller than the inner diameter of longitudinal bore 146, therefore first support member 128 and second centering ring 152 cooperate to keep rotor assembly 120 aligned with longitudinal bore 146 and prevent contact between rotor 122 and the internal surface of longitudinal bore 146 when rotor assembly 120 is in the second position.

The method continues at 30, with rotatably supporting the second end of the rotor assembly with a second support member while the rotor assembly is in the second position. In a variation of the present embodiment, the method comprises sliding the second sleeve over the second end of the rotor assembly, removably securing a guide member to the stator assembly, and supporting the second sleeve with the guide member to place the rotor assembly in the second position. The second sleeve protects the second end of the rotor assembly from physical damage and guides assembly of the rotor within the stator assembly. The guide member is carefully aligned with the stator assembly, and particularly the centerline of the longitudinal bore of the stator core, because misalignment will misguide the rotor therethrough. In one example, the guide member comprises a flange having an outer diameter sized to fit inside an internal shell volume defined by an inner surface of the shell. Fitting the flange into the internal shell volume aligns the centerline of the guide member with the centerline of the longitudinal bore.

After reaching the second position, the second sleeve is removed to enable sliding of the second support member over the second end of the rotor assembly. The second support member is then secured to the stator assembly.

Figure 3:
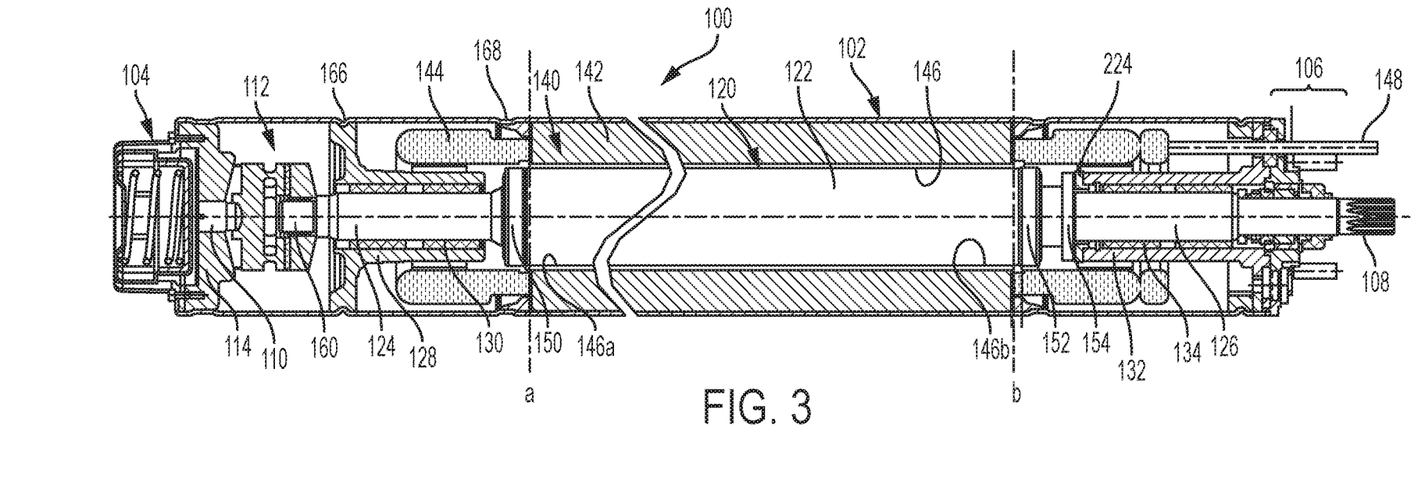
FIG. 3 is an elevational, partial sectional view of the electric motor of FIG. 2 taken along a plane intersecting the longitudinal axis of the electric motor.
Figure 4:
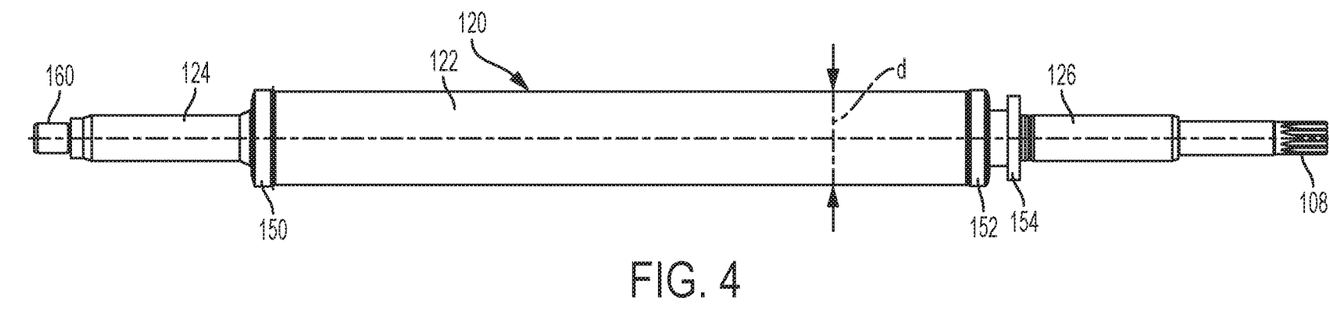
FIG. 4 is a radial elevational view of a rotor assembly of the electric motor of FIG. 2.

The method continues at 32, with placing the rotor assembly in a third position by axially translating the rotor assembly in a second direction, opposite the first direction, until both the first centering ring and the second centering ring are outside the longitudinal bore, whereby in the third position the rotor assembly is rotatably supported by the first support member and the second support member to prevent contact between the rotor and the internal surface of the longitudinal bore. FIG. 3 illustrates rotor assembly 120 in the third position.

Figure 2:
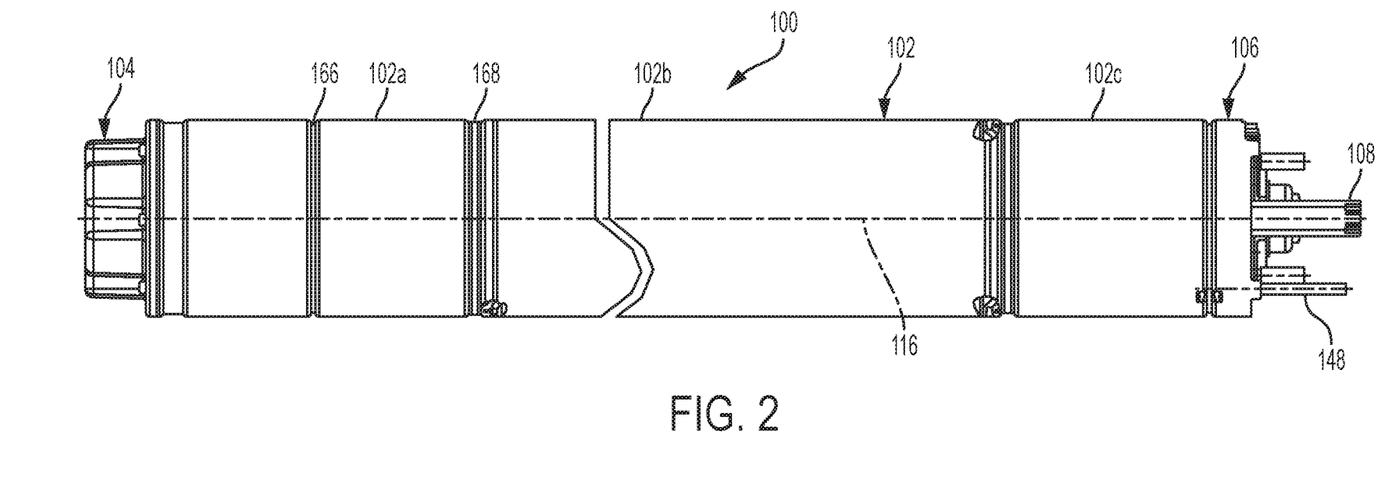
FIG. 2 is an elevational view of an electric motor assembled in accordance with an embodiment of a method set forth in the present disclosure.

FIGS. 2 and 3 depict electric motor 100 comprising shell 102, first end cap assembly 104, second end cap assembly 106, rotor assembly 120, and stator assembly 140. As stated above, rotor assembly 120 is in the third position since motor 100 is assembled. Shell 102, first end cap assembly 104, and second end cap assembly 106 form an enclosure for rotor assembly 120 and stator assembly 140. Stator assembly 140 includes stator core 142 defining longitudinal bore 146 including first end 146a and second end 146b and having longitudinal axis 116. Stator assembly 140 also includes electrical windings 144 in stator core 142 and extending from both ends thereof. Electrical connectors 148 (only one connector 148 is shown) connect electrical windings 144 to an electrical power source (not shown). Rotor assembly 120, best shown in FIG. 4, includes first end 124, second end 126, and rotor 122 therebetween. Rotor 122 is configured to rotate rotor assembly 120 when electrical windings 144 are electrically energized. First support member 128 includes bearing 130, which rotatably supports first end 124. Second support member 132 includes bearing 134, which rotatably support second end 126. Bearings 130, 134 reduce rotational friction. A load, e.g., pump, can be secured to load coupling portion 108 to be driven by motor 100 when it is electrically energized.

Shell 102 includes first shell portion 102a, center shell portion 102b, and second shell portion 102c. In the present embodiment first shell portion 102a, center shell portion 102b, and second shell portion 102c are separate portions of shell 102 that are affixed to each other to form an enclosure for rotor assembly 120 and stator assembly 140. In other embodiments shell 102 comprises more or fewer portions. In one example, shell 102 comprises a single unitary portion. As described further below, first shell portion 102a and first support member 128 are assembled to form first end assembly 200 (best shown in FIG. 8) which is affixed to center shell portion 102b during assembly of motor 100 in any manner well known in the art, e.g., by overlapping and bonding portions thereof to form seam 168. First shell portion 102a includes crimp 166 configured to mate with a groove on a flange of first support member 128 to secure first support member 128 to first shell portion 102a.

As seen in FIG. 3, motor 100 also comprises thrust bearing assembly 112 having a cavity configured to receive thrust bearing coupling portion 160 of first end 124, and support member 114 intermediate first end cap assembly 104 and thrust bearing assembly 112. Axial adjustment member 110 is threadedly supported by support member 114 and can be rotated to adjust the longitudinal position of rotor assembly 120 relative to stator assembly 140.

Figure 11:
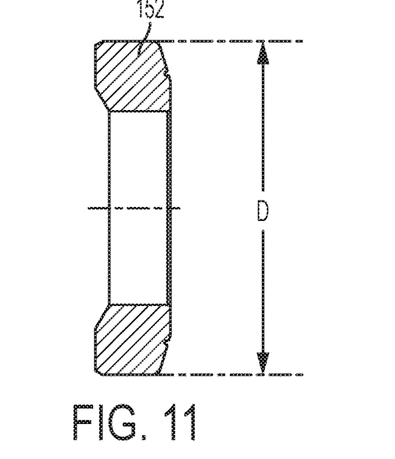
FIG. 11 is a sectional view of an embodiment of a centering ring set forth in the present disclosure taken along a plane intersecting the longitudinal axis of the centering ring.
Figure 12:
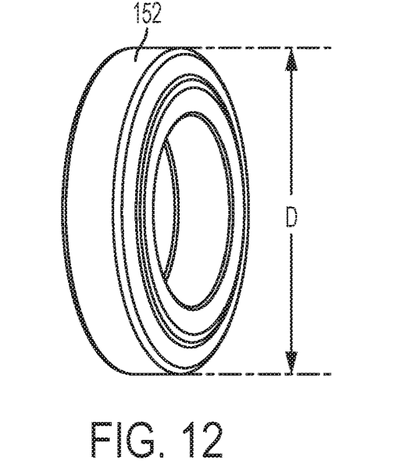
FIG. 12 is a perspective view of the centering ring of FIG. 11.

Rotor assembly 120 further includes first centering ring 150, second centering ring 152, and flange 154. First centering ring 150 is positioned adjacent one end of rotor 122 and second centering ring 152 is positioned adjacent the opposite end of rotor 122. First centering ring 150 and second centering ring 152 are similarly shaped and have an outer diameter D, shown in FIGS. 11 and 12. Rotor 122 has an outer diameter d, depicted in FIG. 4, which is smaller than outer diameter D. In one example, rotor diameter D is between about 5.8 and 8.2 inches and the rotor has a length greater than 40 inches. In another example, rotor diameter D is between about 7.8 and 8.2 inches, and the rotor has a length greater than 50 inches. Consequently, the rotor is sufficiently long and heavy that maneuvering the rotor within the stator core is difficult without the techniques described herein, particularly when performing field repairs. First centering ring 150 and second centering ring 152 can be sized to balance rotor assembly 120 and thereby reduce vibration and extend the life of motor 100. First end 124 and second end 126 are portions of a shaft supporting rotor 122, and first centering ring 150 and second centering ring 152 are secured to the shaft. In another embodiment, at least one of first centering ring 150 and second centering ring 152 is machined in a unitary structure with, respectively, at least one of first end 124 and second end 126. The shaft may be a split shaft. Lines a and b denote the ends of stator core 142. Stator core 142 comprises ferrous laminations. The stator of stator assembly 140 comprises stator core 142 and electrical windings 144.

Load coupling portion 108 and electrical connectors 148 are positioned at the same end of motor 100. In a fluid pumping application, motor 100 is positioned in a well bore with its first end oriented downward and the pump placed above motor 100. Power cables from the surface are connected to electrical connectors 148 which extend upward. In another embodiment, load coupling portion 108 is positioned at one end of a motor and electrical connectors 148 are positioned at the opposite end. The pump is placed below the motor and the electrical connectors extend upward toward the surface.

FIGS. 5 and 6 depict electric motor 100 with rotor assembly 120 in the first position. Electric motor 100 is placed in the first position by axially translating rotor assembly 120 in a first direction through longitudinal bore 146 until first centering ring 150 is positioned adjacent a first end of and within longitudinal bore 146, as described with reference to 24 in FIG. 1. FIG. 6 is a partial expanded view of FIG. 5. First sleeve 170 is positioned over first end 124 and second sleeve 172 is positioned over second end 126 to protect first end 124 and second end 126 from physical damage, and to align and guide rotor assembly 120 through stator core 142 without damaging the internal surface thereof. The second end of motor 100 comprises support member 190 secured to second shell portion 102c by crimp 192, and guide member 180 temporarily secured to portion 194 of second shell portion 102c which extends axially from crimp 192 and defines a cylindrical volume into which flange 182 of guide member 180 is fitted to align guide member 180 with stator assembly 140. Guide member 180 also includes wall 184 extending axially from flange 182 and defining a wall bore therethrough. Second sleeve 172 contacts and is guided by the internal surface of the wall bore of guide member 180. Rotor assembly 120 is maintained in alignment with stator assembly 140 by guide member 180 as it is longitudinally translated in the first direction. Initially guide member 180 guides first sleeve 170 as first end 124 is inserted therethrough, followed by rotor 122, whereby after exiting guide member 180 first sleeve 170 guides first end 124 within longitudinal bore 146 of stator 142 as rotor assembly 120 is moved axially in the first direction. When second end 126 of rotor 122 is within second shell portion 102c, guide member 180 guides second sleeve 172 which maintains second end 126 in alignment and prevents contact between rotor 122 and the internal surface of longitudinal bore 146. At the opposite end (first end) of the motor, in one embodiment rotor assembly 120 is brought to rest with first centering ring 150 resting on longitudinal bore 146. First sleeve 170 is removed and first end assembly 200 is secured to stator assembly 140 (shown in FIGS. 7 and 8). In another embodiment, first sleeve 170 is not used and first end assembly 200 is secured to stator assembly 140 (shown in FIGS. 7 and 8) before rotor assembly 120 is introduced into longitudinal bore 146 or after it is brought to rest with first centering ring 150 resting on longitudinal bore 146. If first end assembly 200 is secured to stator assembly 140 before rotor assembly 120 is introduced into longitudinal bore 146, rotor assembly 120 does not need to be brought to rest with first centering ring 150 resting on longitudinal bore 146 and instead first end 124 is introduced directly into first end assembly 200.

In one variation, second shell portion 102c is first secured to support member 190 and then secured to center shell portion 102b. In another variation, second shell portion 102c is first secured to center shell portion 102b and then secured to support member 190. In a further variation, center shell portion 102b and second shell portion 102c are formed in a unitary structure rather than comprising two components that have to be secured to each other.

As discussed with reference to FIGS. 5 and 6, rotor assembly 120 is maintained in alignment with stator assembly 140 by guide member 180 as it is longitudinally moved in the first direction. Initially guide member 180 guides first sleeve 170 as first end 124 is inserted therethrough. Whence first sleeve 170 exits stator core 142, first centering ring 150 contacts longitudinal bore 146 and guides rotor 122 as rotor assembly 120 continues to be moved axially in the first direction. Then, first centering ring 150 exits stator core 142 and first sleeve 170 or first support member 128 supports first end 124 while second centering ring 152 enters longitudinal bore 146, reaching the second position.

Figure 13:
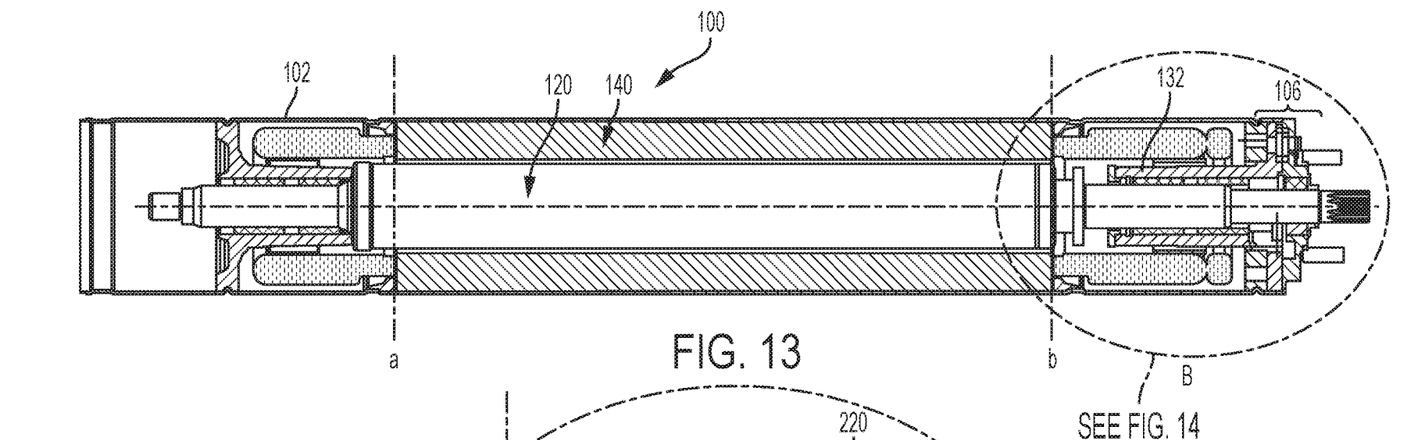
FIGS. 13 and 14 are elevational, partial sectional views of the electric motor of FIG. 2 taken along a plane intersecting the longitudinal axis of the electric motor, with the rotor assembly still in the second position, illustrating a support member rotatably supporting an end of the rotor assembly of the electric motor.
Figure 14:
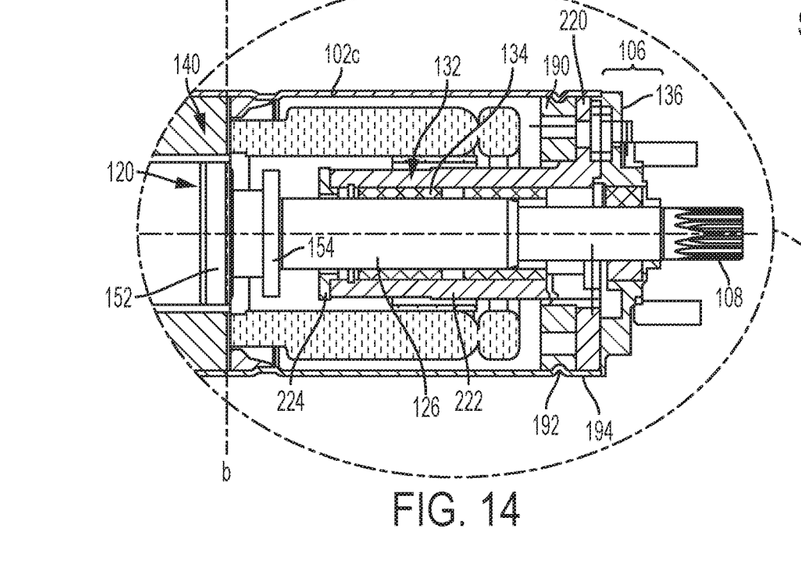

FIGS. 7 and 8 show electric motor 100 with rotor assembly 120 in the second position. Electric motor 100 is placed in the second position by axially translating rotor assembly 120 in the second direction through longitudinal bore 146 until second centering ring 152 is positioned adjacent the second end of and within longitudinal bore 146, as described with reference to 28 in FIG. 1. FIG. 8 is a partial expanded view of FIG. 7, showing an expanded view of the first end of motor 100. Relative to the first position depicted in FIGS. 5 and 6 first sleeve 170 has been replaced with first end assembly 200, which has been secured to center shell portion 102b and thereby secured to stator assembly 140 and defining a longitudinal distance d1 between stop surface 224 and stator core 142, which is configured to permit, during assembly, placement of second centering ring 152 within longitudinal bore 146 while first centering ring 150 is positioned intermediate stop surface 224 and stator core 142. Second sleeve 172 is positioned on second end 126 and guides stator core 142 with the aid of guide member 180. FIGS. 13 and 14, by contrast, show the second end of electric motor 100, still in the second position but with second end 126 and stator core 142 removed and replaced by second support member 132, as described further below.

Figure 9:
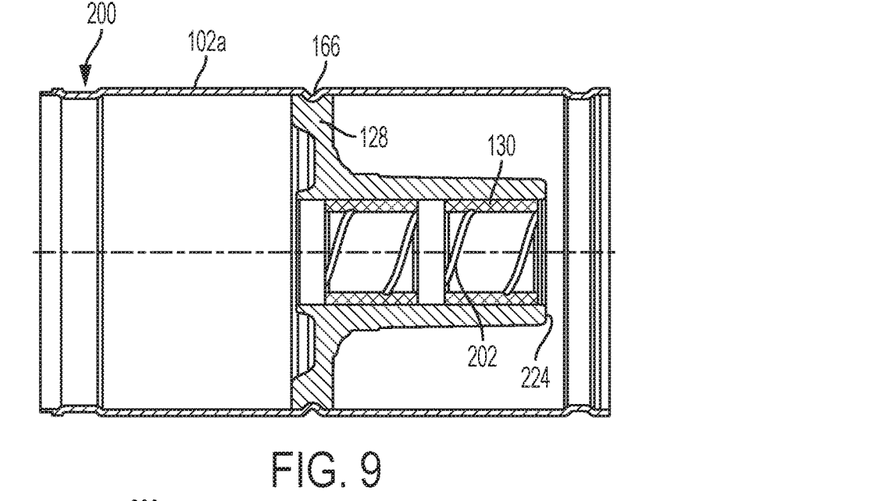
FIG. 9 is a sectional view of a first support assembly of the electric motor of FIG. 2 taken along a plane intersecting the longitudinal axis of the first support assembly.
Figure 10:
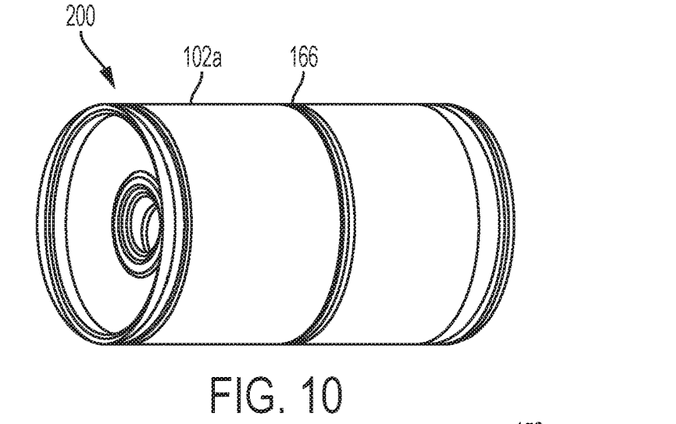
FIG. 10 is a perspective view of the first support assembly of FIG. 9.

FIGS. 9 and 10 show first end assembly 200 and illustrate helical groove 202 on an internal surface of bearing 130. Helical groove 202 provides a fluid path for a liquid to flow therethrough and thus lubricate bearing 130. In one example, bearing 130 is a carbon bearing and the fluid also flows between rotor 122 and stator core 142 to cool motor 100.

Figure 15:
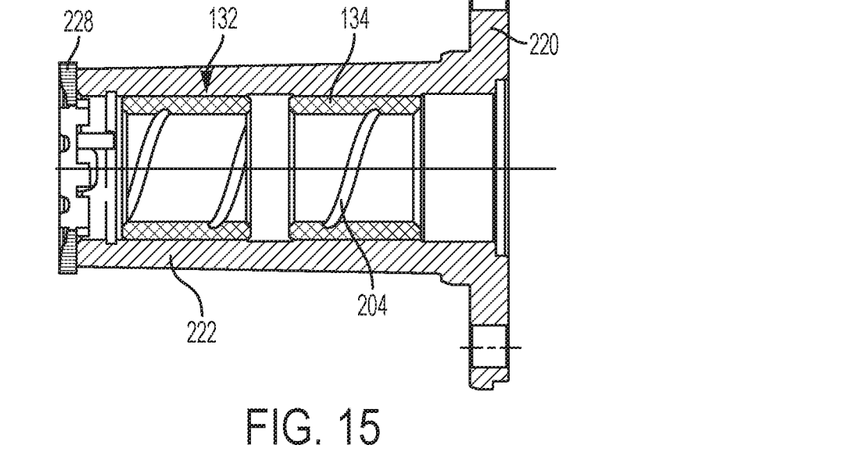
FIG. 15 is a sectional view of the support member of FIGS. 13 and 14 taken along a plane intersecting the longitudinal axis of the support member.
Figure 16:
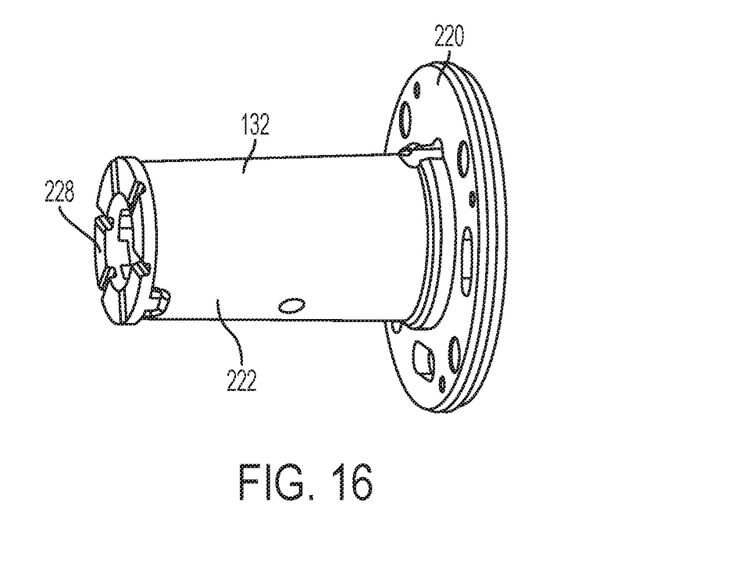
FIG. 16 is a perspective view of the support member of FIGS. 13 and 14.

Referring now to FIGS. 13 to 16, FIGS. 13 and 14 show electric motor 100 with rotor assembly 120 still in the second position. FIG. 14 is a partial expanded view of FIG. 13. After rotor assembly 120 is placed in the second position as discussed above, second centering ring 152 supports the second end of rotor 122 within longitudinal bore 146, facilitating removal of second sleeve 172 and guide member 180 from second end 126 and placement of second support member 132 over second end 126. Second support member 132 is then secured to stator assembly 140, for example by bolting second support member 132 to support member 190, placing rotor 122 in the position shown in FIGS. 13 and 14. FIGS. 15 and 16 show second support member 132 including bearing 134, which is similar to bearing 130, having helical groove 204, which performs the same function as helical groove 202. Second support member 132 includes flange 220 and wall 222 extending axially therefrom. Bearing member 228 is supported by wall 222. As shown in FIGS. 13 and 14, flange 220 is secured to support member 190 to secure second support member 132 to second shell portion 102c. Second end cap 136 of second end cap assembly 106 completes the enclosure of stator assembly 140 and rotor assembly 120.

After second support member 132 is secured to stator assembly 140, rotor assembly 120 is longitudinally translated in the second direction, opposite the first direction, to place rotor assembly 120 in the third position, described above with reference to FIG. 3. Referring again to FIG. 3, bearing member 228 stops longitudinal translation in the second direction of rotor assembly 120 by pressing against flange 154. Accordingly, axial adjustment member 110 is used to adjust the position of rotor assembly 120 relative to bearing member 228 to substantially prevent rotor assembly 120 from translating longitudinally during operation of motor 100.

Examples of the features of the invention are described below.

1. A method of assembling an electric motor, the method comprising:
   inserting a first end and a first centering ring of a rotor assembly into a longitudinal bore of a stator core through a second end of the longitudinal bore, the first centering ring having an outer diameter larger than an outer diameter of a rotor of the rotor assembly to prevent contact between the rotor and an internal surface of the longitudinal bore;
   axially translating the rotor assembly in a first direction through the longitudinal bore to reach a first position in which the first centering ring is positioned adjacent a first end of, and within, the longitudinal bore;
   rotatably supporting the first end of the rotor assembly with a first support member;
   axially translating the rotor assembly in the first direction to place the rotor assembly in a second position in which the first centering ring is outside the longitudinal bore and a second centering ring is within the longitudinal bore adjacent the second end thereof, the second centering ring having an outer diameter larger than the outer diameter of the rotor, whereby the first support member and the second centering ring cooperate to prevent contact between the rotor and the internal surface of the longitudinal bore; and
   axially translating the rotor assembly in a second direction, opposite the first direction, to place the rotor assembly in a third position in which both the first centering ring and the second centering ring are outside the longitudinal bore.

2. A method as in example 1, further comprising: rotatably supporting the second end of the rotor assembly with a second support member; and securing the second support member to the stator assembly.

3. A method as in examples 1 or 2, wherein axially translating the rotor assembly in a first direction through the longitudinal bore to reach a first position comprises, in order: resting the first centering ring on the first end of the longitudinal bore; sliding the first support member over the first end; and rotatably supporting the stator assembly with the first support member.

4. A method as in example 3, wherein the electric motor comprises a first shell portion and a center shell portion secured to the stator assembly, the method further comprising securing the first shell portion to the first support member to form a first end assembly, wherein securing the first support member to the stator assembly comprises securing the first shell portion to the center shell portion.

5. A method as in examples 1, 2 or 3, wherein the electric motor comprises a shell secured to the stator assembly, further comprising: aligning a guide member with the shell; and guiding translation of the rotor assembly with the guide member.

6. A method as in example 5, wherein the guide member comprises a flange having an outer diameter sized to fit inside an internal shell volume defined by an inner surface of the shell, wherein aligning the guide member with the shell comprises fitting the flange into the internal shell volume.

7. A method as in example 6, wherein the guide member comprises a wall extending longitudinally from the flange and defining an elongate wall bore, wherein guiding translation of the rotor assembly comprises moving the rotor assembly through the elongate wall bore.

8. A method as in example 7, further comprising sliding a sleeve over the second end of the rotor assembly, wherein guiding translation of the rotor assembly with the guide member comprises sliding the sleeve through the elongate wall bore, whereby the sleeve is supported by the guide member and cooperates with the first support member to prevent contact between the rotor and the internal surface of the longitudinal bore.

9. A method as in any one of examples 1-8, wherein the rotor is a permanent magnet rotor.

10. A method as in example 9, wherein the rotor has a diameter of between about 5.8 and 8.2 inches and a length greater than 40 inches.

11. A method of assembling an electric motor, the method comprising:
   axially translating a rotor of a rotor assembly in a first direction through an longitudinal bore of a stator, a first centering ring of the rotor assembly preventing a first end of the rotor from contacting an internal surface of the longitudinal bore;
   rotatably supporting a first end of the rotor assembly longitudinally extending from the rotor with a first support member;
   resting a second centering ring of the rotor assembly on the internal surface of the longitudinal bore;
   while resting the second centering ring, rotatably supporting a second end of the rotor assembly longitudinally extending from the rotor with a second support member; and
   axially translating the rotor assembly in a second direction, opposite the first direction, to place the rotor assembly in a position in which both the first centering ring and the second centering ring are outside the longitudinal bore.

12. A method as in example 11, further comprising resting the first centering ring on the longitudinal bore before rotatably supporting the first end of the rotor assembly with the first support member.

13. A method as in examples 11 or 12, wherein the electric motor comprises a first shell portion and a center shell portion secured to the stator, the method further comprising securing the first shell portion to the first support member; and then securing the first shell portion to the center shell portion to couple the first support member and the stator.

14. A method as in examples 11, 12, or 13, wherein the electric motor comprises a shell secured to the stator, the method further comprising aligning a guide member with the shell; securing the guide member to the shell; and guiding longitudinal translation of the rotor assembly with the guide member.

15. A method as in example 14, wherein the guide member comprises a flange having an outer diameter sized to fit inside an internal shell volume defined by an inner surface of the shell, wherein aligning the guide member with the shell comprises fitting the flange into the internal shell volume.

16. A method as in example 15, wherein the guide member comprises a wall extending longitudinally from the flange and defining an elongate wall bore, wherein guiding translation of the rotor assembly comprises moving the rotor assembly through the elongate wall bore.

17. An electric motor assembly comprising:
means for conducting electrical current;
rotating means;
stationary means for rotatably receiving the rotating means, the rotating means and the stationary means configured to cause the rotating means to rotate upon application of electrical energy to the means for conducting electrical current;
first centering means disposed on a first end of the rotating means for preventing contact between the rotating means and the stationary means during assembly;
second centering means disposed on a second end of the rotating means for preventing contact between the rotating means and the stationary means during assembly; and
support means for rotatably supporting the first end of the rotating means and stopping longitudinal translation of the rotating means through the stationary means during assembly,
wherein the support means is secured to the stationary means to define a longitudinal distance therebetween, said longitudinal distance configured to permit, during assembly, positioning of the second centering means within a longitudinal cavity of the stationary means while the first centering means is positioned outside the longitudinal cavity adjacent the support means.

18. An electric motor assembly as in example 17, further comprising: guide means temporarily affixed to the stationary means during assembly for guiding longitudinal translation of the rotating means through the stationary means.

19. An electric motor assembly comprising:
electrical windings;
a stator assembly including a stator core having a longitudinal bore with an inner diameter;
a rotor assembly including a rotor, a first end extending longitudinally from the rotor, a second end extending longitudinally from the rotor, a first centering ring on the first end, and a second centering ring on the second end, the first centering ring having an outer diameter smaller than the inner diameter of the longitudinal bore and larger than an outer diameter of the rotor to prevent contact between the longitudinal bore and a first end of the rotor during assembly, the rotor assembly configured to rotate upon application of electrical energy to the electrical windings; and
a first support member having a stop surface configured to stop longitudinal translation of the rotor assembly during assembly of the electrical motor, the first support member secured to the stator assembly and configured to permit, during assembly of the electrical motor, positioning of the second centering ring within the longitudinal bore while the first centering ring is positioned outside the longitudinal bore and adjacent the stop surface.

20. An electric motor assembly as in example 19, further comprising a shell secured to the stator assembly; and a guide member secured to the shell, the guide member configured to guide the second end of the rotor assembly and cooperate with the first centering ring and the first support member to prevent contact between the rotor and the internal surface of the longitudinal bore during assembly of the electrical motor.

21. An electric motor assembly as in examples 20, wherein the guide member comprises a flange having an outer diameter sized to fit inside an internal shell volume defined by an inner surface of the shell, wherein aligning the guide member with the shell comprises fitting the flange into the internal shell volume.

22. An electric motor assembly as in example 20, or 21, wherein the guide member comprises a wall extending longitudinally from the flange and defining an elongate wall bore configured to guide longitudinal translation of the stator assembly during assembly of the electrical motor.

23. An electric motor assembly as in any one of examples 19-22, wherein the rotor is a permanent magnet rotor.

24. An electric motor assembly as in example 23, wherein the rotor has a diameter of between about 5.8 and 8.2 inches and a length greater than 40 inches.

The foregoing embodiments disclose exemplary designs of a method to assemble a motor and a motor assembly. While the invention has been described as having exemplary designs, the present invention may be further modified with the spirit and scope of this disclosure. Further, this application is intended to cover such departures from the present disclosure as come within known or customary practice in the art to which this invention pertains.

What is claimed is:
1. A method of assembling an electric motor, the method comprising:
inserting a first end and a first centering ring of a rotor assembly into a longitudinal bore of a stator core through a second end of the longitudinal bore, the first centering ring having an outer diameter larger than an outer diameter of a rotor of the rotor assembly to prevent contact between the rotor and an internal surface of the longitudinal bore;
axially translating the rotor assembly in a first direction through the longitudinal bore to reach a first position in which the first centering ring is positioned adjacent a first end of, and within, the longitudinal bore;
rotatably supporting the first end of the rotor assembly with a first support member;
axially translating the rotor assembly in the first direction to place the rotor assembly in a second position in which the first centering ring is outside the longitudinal bore and a second centering ring is within the longitudinal bore adjacent the second end thereof, the second centering ring having an outer diameter larger than the outer diameter of the rotor, whereby the first support member and the second centering ring cooperate to prevent contact between the rotor and the internal surface of the longitudinal bore; and
axially translating the rotor assembly in a second direction, opposite the first direction, to place the rotor assembly in a third position in which both the first centering ring and the second centering ring are outside the longitudinal bore.

2. The method of claim 1, further comprising:
rotatably supporting the second end of the rotor assembly with a second support member; and
securing the second support member to the stator assembly.

3. The method of claim 1, wherein axially translating the rotor assembly in a first direction through the longitudinal bore to reach a first position comprises, in order:
resting the first centering ring on the first end of the longitudinal bore;
sliding the first support member over the first end; and
rotatably supporting the stator assembly with the first support member.

4. The method of claim 3, wherein the electric motor comprises a first shell portion and a center shell portion secured to the stator assembly, the method further comprising securing the first shell portion to the first support member to form a first end assembly, wherein securing the first support member to the stator assembly comprises securing the first shell portion to the center shell portion.

5. The method of claim 1, wherein the electric motor comprises a shell secured to the stator assembly, further comprising:
aligning a guide member with the shell; and
guiding translation of the rotor assembly with the guide member.

6. The method of claim 5, wherein the guide member comprises a flange having an outer diameter sized to fit inside an internal shell volume defined by an inner surface of the shell, wherein aligning the guide member with the shell comprises fitting the flange into the internal shell volume.

7. The method of claim 6, wherein the guide member comprises a wall extending longitudinally from the flange and defining an elongate wall bore, wherein guiding translation of the rotor assembly comprises moving the rotor assembly through the elongate wall bore.

8. The method of claim 7, further comprising sliding a sleeve over the second end of the rotor assembly, wherein guiding translation of the rotor assembly with the guide member comprises sliding the sleeve through the elongate wall bore, whereby the sleeve is supported by the guide member and cooperates with the first support member to prevent contact between the rotor and the internal surface of the longitudinal bore.

9. The method of claim 1, wherein the rotor is a permanent magnet rotor.

10. The method of claim 9, wherein the rotor has a diameter of between about 5.8 and 8.2 inches and a length greater than 40 inches.

11. A method of assembling an electric motor, the method comprising:
axially translating a rotor of a rotor assembly in a first direction through an longitudinal bore of a stator, a first centering ring of the rotor assembly preventing a first end of the rotor from contacting an internal surface of the longitudinal bore;
rotatably supporting a first end of the rotor assembly longitudinally extending from the rotor with a first support member;
resting a second centering ring of the rotor assembly on the internal surface of the longitudinal bore;
while resting the second centering ring, rotatably supporting a second end of the rotor assembly longitudinally extending from the rotor with a second support member; and
axially translating the rotor assembly in a second direction, opposite the first direction, to place the rotor assembly in a position in which both the first centering ring and the second centering ring are outside the longitudinal bore.

12. The method of claim 11, further comprising resting the first centering ring on the longitudinal bore before rotatably supporting the first end of the rotor assembly with the first support member.

13. The method of claim 11, wherein the electric motor comprises a first shell portion and a center shell portion secured to the stator, the method further comprising securing the first shell portion to the first support member; and then securing the first shell portion to the center shell portion to couple the first support member and the stator.

14. The method of claim 11, wherein the electric motor comprises a shell secured to the stator, the method further comprising aligning a guide member with the shell; securing the guide member to the shell; and guiding longitudinal translation of the rotor assembly with the guide member.

15. The method of claim 14, wherein the guide member comprises a flange having an outer diameter sized to fit inside an internal shell volume defined by an inner surface of the shell, wherein aligning the guide member with the shell comprises fitting the flange into the internal shell volume.

16. The method of claim 15, wherein the guide member comprises a wall extending longitudinally from the flange and defining an elongate wall bore, wherein guiding translation of the rotor assembly comprises moving the rotor assembly through the elongate wall bore.

* * * * *